(12) United States Patent
Via et al.

(10) Patent No.: US 8,735,319 B2
(45) Date of Patent: May 27, 2014

(54) METAL CONTAMINANT REMOVAL COMPOSITIONS AND METHODS FOR MAKING AND USING THE SAME

(71) Applicants: St. Cloud Mining Company, Arenas Valley, NM (US); Via Consulting, LLC, Yorktown Heights, NY (US)

(72) Inventors: Francis A Via, Yorktown Heights, NY (US); William Ahrens, Tucson, AZ (US); Daniel T Eyde, Tuscon, AZ (US)

(73) Assignees: St. Cloud Mining Company, Arenas Valley, NM (US); Via Consulting, LLC, Yorktown Heights, NY (US)

( * ) Notice: Subject to any disclaimer, the term of this patent is extended or adjusted under 35 U.S.C. 154(b) by 0 days.

(21) Appl. No.: 13/943,205

(22) Filed: Jul. 16, 2013

(65) Prior Publication Data

US 2013/0303366 A1    Nov. 14, 2013

Related U.S. Application Data

(62) Division of application No. 12/692,811, filed on Jan. 25, 2010, now Pat. No. 8,535,422.

(60) Provisional application No. 61/147,295, filed on Jan. 26, 2009.

(51) Int. Cl.
*B01J 20/00* (2006.01)

(52) U.S. Cl.
USPC ............... 502/417; 502/400; 502/407; 95/36; 95/133; 95/134; 96/108; 252/182.32

(58) Field of Classification Search
USPC ............ 96/108; 95/36, 133, 134; 252/182.32; 502/400, 407, 417
See application file for complete search history.

(56) References Cited

U.S. PATENT DOCUMENTS

| | | | |
|---|---|---|---|
| 2,201,124 A | 5/1940 | Ehman et al. | |
| 3,032,510 A | 5/1962 | Erik et al. | |
| 3,194,629 A | 7/1965 | Dreibelbis et al. | |
| 3,688,992 A | 9/1972 | Schallis | |
| 3,799,884 A | 3/1974 | Young | |
| 4,101,631 A | 7/1978 | Ambrosini et al. | |
| 4,154,699 A | 5/1979 | Mueller-Tamm et al. | |
| 4,237,029 A | 12/1980 | Fodor | |
| 4,321,079 A | 3/1982 | Ott | |
| 4,329,253 A | 5/1982 | Goodall | |
| 4,338,288 A | 7/1982 | Rollmann | |
| 4,474,896 A | 10/1984 | Chao | |
| 4,708,853 A | 11/1987 | Matviya et al. | |
| 4,814,152 A | 3/1989 | Yan | |
| 4,911,825 A | 3/1990 | Roussel et al. | |
| 4,985,389 A | 1/1991 | Audeh | |
| 5,085,844 A | 2/1992 | Nowack et al. | |
| 5,352,647 A | 10/1994 | Suchenwirth | |
| 6,136,749 A | 10/2000 | Gadkaree et al. | |
| 6,258,334 B1 | 7/2001 | Gadkaree et al. | |
| 6,521,131 B1 | 2/2003 | Hamilton et al. | |
| 6,524,371 B2 | 2/2003 | El-Shoubary et al. | |
| 6,533,842 B1 | 3/2003 | Maes et al. | |
| 6,582,497 B1 | 6/2003 | Maes et al. | |
| 6,589,318 B2 | 7/2003 | El-Shoubary et al. | |
| 6,638,347 B2 | 10/2003 | El-Shoubary et al. | |
| 7,048,781 B1 | 5/2006 | Lovell | |
| 7,132,482 B2 | 11/2006 | Tidow et al. | |
| 7,288,499 B1 | 10/2007 | Lovell et al. | |
| 7,341,667 B2 | 3/2008 | Kennard et al. | |
| 2001/0007647 A1 | 7/2001 | Honjo et al. | |
| 2007/0140940 A1 | 6/2007 | Varma et al. | |
| 2008/0274874 A1 | 11/2008 | Heschel et al. | |
| 2008/0289498 A1 | 11/2008 | Heschel et al. | |

FOREIGN PATENT DOCUMENTS

JP         62213837 A      9/1987

OTHER PUBLICATIONS

Daza et al., "Mercury adsorption by sulfurized fibrous silicates," Clay and Clay Minerals, 1991, 39(1):14-21.
Kellie et al., "Mercury emissions from a 100-MW wall-fired boiler as measured by semi-continuous mercury monitor and Ontario hydro method," Fuel Processing Technology, 2004, 85:487-499.
Krishnan et al., "Uptake of heavy metals in batch systems by sulfurized steam activated carbon prepared from sugarcane bagasse pith," Ind. Eng. Chem. Res., 2002, 41(20):5085-5093.
Yaun et al., "Preparation of Sulfurized Powdered Activated Carbon from Waste Tires Using an Innovative Compositive Impregnation Process," J. Air & Waste Manage. Assoc., 2004, 54:862-870.
Wu et al., "Evaluation of mercury sorbents in a lab-scale multiphase flowreactor, a pilot-scale slipstream reactor and full-scale power plant," Chemical Engineering Science, 2008, 63:782-790.

*Primary Examiner* — Christopher P Jones
(74) *Attorney, Agent, or Firm* — James A. Bradburne

(57) ABSTRACT

Metal sorbent compositions for removing a metal contaminant from a fluid, such as removal of mercury from a coal-fired flue gas stream, and methods for making and using the same are provided. The subject metal sorbent compositions comprise an effective amount of an aqueous dispersion of microfine elemental sulfur particles on an adsorbent substrate, and optionally, a metal capture enhancing agent such as a halogen source and/or an oxidizing agent in an amount providing a metal capture enhancing effect on the metal sorbent composition. The subject metal sorbent compositions are prepared by drying an aqueous dispersion of microfine elemental sulfur particles on an adsorbent substrate, such as on a substrate of microfine particles of a refractory material and the like. Also provided are kits for use in preparing the subject compositions, and compositions produced by the methods. The subject compositions, kits and systems find use in a variety of different applications.

3 Claims, 1 Drawing Sheet

METAL CONTAMINANT REMOVAL COMPOSITIONS AND METHODS FOR MAKING AND USING THE SAME

CROSS-REFERENCE TO RELATED APPLICATIONS

This is a divisional of U.S. patent application Ser. No. 12/692,811, filed Jan. 25, 2010, which is a non-provisional of U.S. Provisional Patent Application Ser. No. 61/147,295 filed Jan. 26, 2009; the disclosure of which are herein incorporated by reference.

TECHNICAL FIELD

The invention relates to metal contaminant removal compositions, and methods for making and using the same, and in particular to compositions and processes for removing environmentally hazardous metal contaminants from a fluid, such as removing mercury from coal-fired gas streams.

INTRODUCTION

A number of metal sorbent compositions have been used to scrub or remove contaminating metals from fluids, such as found in various gas or vaporized streams in industrial processes. However, currently available metal removal compositions can suffer from serious limitations with regards to safety in their preparation and use, efficiency, stability, disposal, and general robustness and cost. Removal of mercury (Hg) contaminants is of particular concern.

Mercury can be released in significant quantities in process streams and during combustion, such as from power plants based on fossil fuels such as natural gas, oil and coal, as well as waste disposal, including municipal and hazardous waste, crematoria, and sewage sludge incineration. Hazardous amounts of mercury can also be released during many other industrial processes, such as in gold production, non-ferrous metal production, cement production, caustic soda production, pig iron and steel production, and battery production. Stationary combustion accounts for the bulk of mercury emissions, of which coal-fired power plants are the largest aggregate source.

The total number of active coal plants world-wide is over 50,000 and rising. It is estimated that fossil fuels will account for 85% of the global energy market by 2030. With the growing energy demand driving fossil fuel consumption and power plant expansion, mitigating the accumulation of mercury in the food chain and environment represents a significant regulatory focus. Because mercury is volatile, only small amounts are removed along with fly ash by particulate control devices such as electrostatic precipitators. The remainder is emitted into the atmosphere along with the flue gases. As such, mercury has received special emission restrictions because of its high toxicity and widespread bioaccumulation (Mercury Study Report to Congress, U.S. Government Printing Office: Washington, D.C., 1997; A Study of Hazardous Air Pollutant Emissions from Electric Utility Steam Generating Units: Final Report to Congress, U.S. Government Printing Office: Washington, D.C., 1998; and U.S. EPA Clean Air Mercury Rule, U.S. Environmental Protection Agency: Washington, D.C., 2005, http://www.epa.gov).

Removal of elemental mercury from industrial process streams is challenging, since it is practically insoluble in water, but can be removed to a certain extent with metal sorbent compositions based on activated carbon. Activated carbon is one of the primary systems exploited for removing mercury, heavy metals, and dioxins from industrial flue gas streams. Unfortunately, activated carbon production technologies are complex and expensive. For example, U.S. Pat. No. 3,194,629 discloses that activated carbon impregnated with elemental sulfur using the highly flammable solvent carbon disulfide. U.S. Pat. No. 4,708,853 discloses a carbon molecular sieve that is physically mixed with powdered elemental sulfur and subjected to a heat treatment at 150° C. (sulfur has a melting point of about 112-120° C.). Krishnan et al. (*Ind. Eng. Chem. Res*. (2002) 41(20):5085-5093) report on sulfurized steam activated carbon, prepared using a complex chemical process involving steam pyrolysis in the presence of $SO_2$ and $H_2S$ at 400° C. Lin et al. (*J. Air & Waste Manage. Assoc*. (2004) 54:862-870) report on a sulfurized powdered activated carbon sorbent, in which carbon is impregnated with sodium sulfide and pyrolized at high temperature.

Another complex, multi-step, high temperature process for making carbon-based metal sorbent compositions is disclosed in U.S. Pat. Nos. 6,136,749 and 6,258,334. Here the compositions are prepared by forming an intimate mixture of a synthetic carbon precursor and elemental sulfur, such as 20% elemental sulfur (−200 mesh or 74 microns), with 80% Durite liquid phenolic resin. The carbon precursor mixture containing the sulfur is cured, reacted, carbonized and activated to produce a carbon catalyst having sulfur chemically modified and bonded to carbon. This is accomplished typically by heating to temperatures of about 600 to 1000° C. for about 1 to 10 hours in a reducing or inert atmosphere.

In addition to activated carbon, several methods have been reported for absorbing mercury from process streams using non-carbon adsorbents containing elemental sulfur and sulfur containing compounds on a support. U.S. Pat. No. 4,101,631 discloses the physical dry mixing of sulfur powder with a support of sodium zeolite in a tumbled blender for removing trace mercury from natural gas streams. U.S. Pat. Nos. 4,474,896 and 4,985,389 report on a polysulfide based sorbent for removing mercury from gaseous liquid hydrocarbon streams, which sorbent is made by contacting a molecular sieve with an aqueous solution of water soluble alkali polysulfide until the molecular sieve is saturated with the aqueous solution, followed by a drying step. U.S. Pat. No. 4,814,152 discloses use of carbon disulfide solvent to dissolve elemental sulfur and to coat an inert support that, together with metal catalysts, is employed to capture mercury from natural gas. U.S. Pat. No. 7,048,781 reports on contacting a silicate such as a zeolite with an aqueous solution of water soluble metal ammonium sulfides to prepare a mercury control agent. U.S. Pat. No. 5,352,647 reports on several mercury sorbents made by distributing sulfur or water soluble sulfur containing compounds onto an active support of slaked lime (calcium hydroxide) in water followed by drying. U.S. Pat. No. 7,288,499 discloses the use of a chemical reaction to put a sulfide on a support in which (i) polyvalent metals including tin (both Sn(II) and Sn(IV)), iron (both Fe(II) and Fe(III)), titanium, manganese, zirconium and molybdenum are dissolved as salts, to produce an exchanged substrate on a phyllosilicate such as montmorillinite, followed by (ii) treatment with a sulfide ion source to produce a sorbent for removal of mercury from flue gas.

Chemical transformation routes to place sulfur compounds on a support have also been reported. In U.S. Pat. No. 5,085,844 water soluble metal polysulfides are placed on the support and then chemically converted to elemental sulfur. In another chemical route, sulfur is supported on sepiolite and palygorskite fibrous clay by oxidation of hydrogen sulfide at greater than 200° C. (Daza et al., Clay and Clay Minerals (1991) 39(1):14-21).

Further, U.S. Pat. No. 4,708,853 discloses the use of ferric chloride on activated carbon for removal of mercury from fluids. A sorbent for removing metals from fluids including mercury is disclosed in U.S. Pat. No. 4,338,288 where dry manganese nodules are mixed with elemental sulfur and heated to promote a transformation, U.S. Pat. Nos. 6,638,347, 6,524,371, 6,533,842, 6,582,497 and 6,589,318 report on the use of copper chloride on carbon based supports also with potassium iodide as mercury removal adsorbents. U.S. Patent Application, Number 20070140940A1, reports on use of metal halides on a silica support as oxidative sorbents for removal of mercury from fluids.

Although a variety of metal sorbent compositions and methods for metal contaminant removal have been reported, there remains a need for new approaches. As a result of the energy intensive manufacturing process, the cost of producing metal sorbent compositions using complex processes can be relatively high and subject to fluctuations associated with oil or energy pricing. In addition, safety remains a concern in dealing with hazardous conditions and materials employed in the manufacturing process of many sorbents. A further drawback is limited stability and metal capture efficiency. Yet another problem involves disposal of the metal-laced sorbent and fly ash material produced as a byproduct of scrubbing. For example, coal fly ash has potential commercial reuse value, such as in cement manufacturing. However, unwanted metal leaching and/or limits of carbon content or other residual sorbent materials are imposed to address safety issues that include preventing deterioration of the cement product relative to durability and freeze-thaw cycling. This is of particular concern where excess carbon in the ash used in cement will absorb entrained air, which produces a less durable material. In addition, the plastics industry requires fillers to reduce product cost and will only consider the use of coal fly ash that is low in carbon.

It is apparent that useful metal sorbent compositions and methods are needed with properties that can render them more effective and commercially viable for fluid scrubbing applications. Characteristics, such as low cost, safety, ease of manufacture and use, metal capture efficiency, disposal and reuse characteristics, are vital to successful removal of metals from industrial process streams. As such, there is a continued need for the development of new metal sorbent compositions for the removal of metals from fluids, as well as for use in other applications.

SUMMARY OF THE INVENTION

Metal sorbent compositions for removing a metal contaminant from a fluid, and methods for making and using the same are provided. The compositions are capable of capturing, with high efficiency, a broad range of metal contaminants from any number of fluids, particularly metals from a gas, including combustion gas and process streams, such as mercury from coal-fired flue gas.

The subject metal sorbent compositions include an effective amount of a dispersion of microfine elemental sulfur particles supported on an adsorbent substrate. The microfine elemental sulfur particles generally have an average particle size of less than about 45 microns, and the adsorbent substrate in representative embodiments comprises particles of a refractory material, such as particles of a refractory oxide comprising a zeolite, diatomaceous earth, and the like. In certain embodiments, the particles of a refractory material are microfine particles.

The subject compositions can be prepared by applying and drying an aqueous suspension or solution of the microfine elemental sulfur particles on the adsorbent substrate. In many embodiments, the applying and drying are each individually at a temperature that is less than the melting temperature of the microfine elemental sulfur particles, and in as many embodiments, the aqueous suspension or solution is applied at less than the adsorption capacity of the adsorbent substrate, and in some embodiments the subject compositions are prepared essentially as a free flowing dry powder.

In certain embodiments, the subject metal sorbent compositions include a metal capture enhancing agent in an amount that provides a metal capture enhancing effect on the composition, and in some embodiments, a synergistic metal capture enhancing effect. The metal capture enhancing agent may be provided with the subject metal sorbent composition as a gas, liquid, and/or solid, as well as on the same or a separate support from the elemental sulfur particles in the composition, thereby affording surprisingly broad flexibility in the production, storage, and application of the metal sorbent compositions. In particular embodiments, the metal capture enhancing agent is supported on the adsorbent substrate, a second substrate, or a combination thereof, where the adsorbent substrate and the second substrate are composed of the same or different material. In some embodiments, the subject metal sorbent compositions comprise at least two or more different metal capture enhancing agents, such as a combination of a halogen source and an oxidizing agent, and in as many embodiments, the at least two or more different metal capture enhancing agents are each individually supported on the adsorbent substrate, the second substrate, one or more additional substrates, or a combination thereof, where the adsorbent substrate, the second substrate, and the one or more additional substrates are each individually composed of the same or different material.

In one embodiment, the metal capture enhancing agent is selected from a halogen source, an oxidizing agent, and combinations thereof. An exemplary halogen source comprises a halogen atom selected from chorine, bromine, iodine, and combinations thereof, such as elemental halogen and/or a halide comprising a chloride, bromide, or iodide source, and particularly a chloride and/or bromide source. The oxidizing agent may include a halogen source, or be devoid of a halogen source, and thus the halogen source and the oxidizing agent may comprise the same or different compounds. In embodiments where the halogen source and the oxidizing agent comprise different compounds, the halogen source and/or oxidizing agent may be provided alone or in combination with each other in the subject metal sorbent compositions. In representative embodiments, the halogen source and/or oxidizing agent is supported on a separate support from the adsorbent substrate on which the elemental sulfur particles are supported, and when included in combination the halogen source may be provided on the same or a separate support from the oxidizing agent in the composition. The subject metal sorbent compositions may further include one or more additional agents or excipients, such as dispersing agents and the like, particularly those that increase the utility of the subject compositions.

Also provided are methods of production, methods of removing a metal contaminant from a fluid, and kits and systems for use in preparing the subject compositions, as well as compositions produced by the methods. The subject compositions, methods, kits and systems find use in a variety of different applications.

Thus representative compositions include: (1) a metal sorbent composition capable of removing a metal contaminant from a fluid, comprising an effective amount of an aqueous dispersion of microfine elemental sulfur particles supported on an adsorbent substrate, and optionally, a metal capture enhancing agent in an amount having a metal capture enhancing effect on the metal sorbent composition. In as many embodiments of composition (1) above, (2) the aqueous dispersion of microfine elemental sulfur particles is dried on the surface of the adsorbent substrate, and/or (3) the adsorbent substrate comprises particles of a refractory material, and the metal sorbent composition is essentially a free flowing dry powder. In as many embodiments of composition (1) above, (4) the metal contaminant is mercury, (5) the fluid is coal-fired flue gas, (6) the microfine elemental sulfur particles have an average particle size of less than about 45 microns, (7) the microfine elemental sulfur particles are present in an amount that is at least 0.1% by weight of the metal sorbent composition, and optionally, less than the adsorption capacity of the adsorbent substrate, and/or (8) the microfine elemental sulfur particles are produced by ball milling. In one embodiment of composition (3) above, (9) the subject metal sorbent composition is produced by (a) applying on the adsorbent substrate the aqueous dispersion of microfine elemental sulfur particles under conditions that form a mixture comprising essentially a free flowing powder, and (b) drying the mixture, such as where (10) the applying and the drying is at a temperature less than about the melting point of the microfine elemental sulfur particles, and/or (11) the applying comprises spraying the aqueous dispersion of microfine elemental sulfur particles onto the adsorbent substrate. In certain embodiments of composition (1) above, (12) the aqueous dispersion further comprises a dispersing agent. In some embodiments of composition (1) above, (13) the subject metal sorbent composition further comprises a metal capture enhancing agent. In one embodiment of composition (13) above, (14) the metal capture enhancing agent is supported on the adsorbent substrate, a second adsorbent substrate, or a combination thereof, and wherein the adsorbent substrate and the second adsorbent substrate are the same or different. In one embodiment of composition (14) above, for example, (15) the metal sorbent composition comprises at least two different metal capture enhancing agents each individually supported on the adsorbent substrate, the second adsorbent substrate, one or more additional substrates, or a combination thereof, and wherein the adsorbent substrate, the second adsorbent substrate, and the one of more additional substrates are each individually composed of the same or different material. In as many embodiments of composition (13) above, (16) the metal capture enhancing agent is selected from the group consisting of a halogen source, an oxidizing agent, and combinations thereof. In some embodiments of composition (1) above, the subject adsorbent substrate: (17) comprises particles of a refractory material having an average particle size of less than about 100 microns, and/or (18) is a support selected from the group consisting of a carbon based support, a non-carbon based support, and combinations thereof. In one embodiment of composition (18) above, for example, (19) the carbon based support is activated carbon, and the non-carbon based support is a silica-based support.

Representative compositions also include: (20) a metal sorbent composition capable of capturing mercury from a fluid, comprising an effective amount of (a) elemental sulfur particles supported on a first adsorbent substrate particle, and (b) a metal capture enhancing agent supported on a second adsorbent substrate particle, wherein the elemental sulfur particles and the metal capture enhancing agent are present in a weight ratio having a metal capture enhancing effect on the metal sorbent composition, and wherein the first and second adsorbent substrate particles are comprised of the same or different material.

Representative methods of producing a subject metal sorbent composition include a method comprising: (21) (a) applying a metal capturing effective amount of an aqueous suspension of microfine elemental sulfur particles onto an absorbent substrate under conditions to form a mixture, the mixture comprising a dispersion of the particles supported on the surface of the substrate; and (b) drying the mixture to produce the metal sorbent composition. In some embodiments, method (21) above further comprises: (22) applying a metal capture enhancing agent to the adsorbent substrate in an amount having a metal capture enhancing effect on the metal sorbent composition.

Representative methods of producing a subject metal sorbent composition also include a method comprising: (23) admixing a metal capturing effective amount of (a) elemental sulfur particles supported on a first adsorbent substrate particle, and (b) a metal capture enhancing agent supported on a second adsorbent substrate particle, wherein the elemental sulfur particles and the metal capture enhancing agent are present in a weight ratio having a metal capture enhancing effect on the metal sorbent composition, and wherein the first and second adsorbent substrate particles are comprised of the same or different material.

Representative compositions also include: (24) a metal sorbent composition produced by the method according to any one of methods (21) and (23) above.

Representative methods further include: (25) a method of removing a metal contaminant from a fluid, the method comprising: (a) contacting the fluid with a metal capturing effective amount of a metal sorbent composition according to any one of compositions (1) and (20) above; (b) forming an adduct comprising the metal sorbent composition and one or more metal contaminants of the fluid; and (c) removing the adduct. In as many embodiments of method (25) above, (26) the metal contaminant is mercury, and/or (27) the fluid is coal-fired flue gas. In one embodiment of method (27), for example, (28) the adduct is comprised as a component of treated fly ash. In one embodiment of method (28), for example, (29) leachate from the adduct contains less than about 0.2 parts per million (ppm) mercury as measured by the Toxicity Characteristic Leaching Procedure (TCLP).

Representative compositions also include: (30) a composition comprising the adduct produced by the method of (25) above, such as (31) a composition comprising treated fly ash produced by the method of (29) above, wherein the treated fly ash comprises about 0.1% to 10% by weight of the adduct. In one embodiment, (32) the composition of (31) above is cement.

Representative kits include: (33) a kit comprising a metal sorbent composition according to any one of the compositions of (1), (20), and (24) above.

Representative kits also include: (34) a kit for removing a metal contaminant from a fluid, the kit comprising as components: (a) a first container containing a first composition, the first composition comprising an aqueous suspension or solution of highly dispersed microfine elemental sulfur particles; and (b) a second container containing a second composition, the second composition comprising adsorbent substrate particles; wherein the first and second compositions are present in an amount sufficient for forming an effective amount of a metal sorbent composition upon applying and drying the aqueous dispersion of microfine elemental sulfur particles on the adsorbent substrate particles.

Representative kits further include: (35) a kit for removing a metal contaminant from a fluid, the kit comprising as components: (a) a first container containing a metal capturing effective amount of a first composition, the first composition comprising elemental sulfur particles supported on a first adsorbent substrate particle; and (b) a second container containing a metal capturing effective amount of a second composition, the second composition comprising a metal capture enhancing agent supported on a second adsorbent substrate particle.

DEFINITIONS

Figure 1:
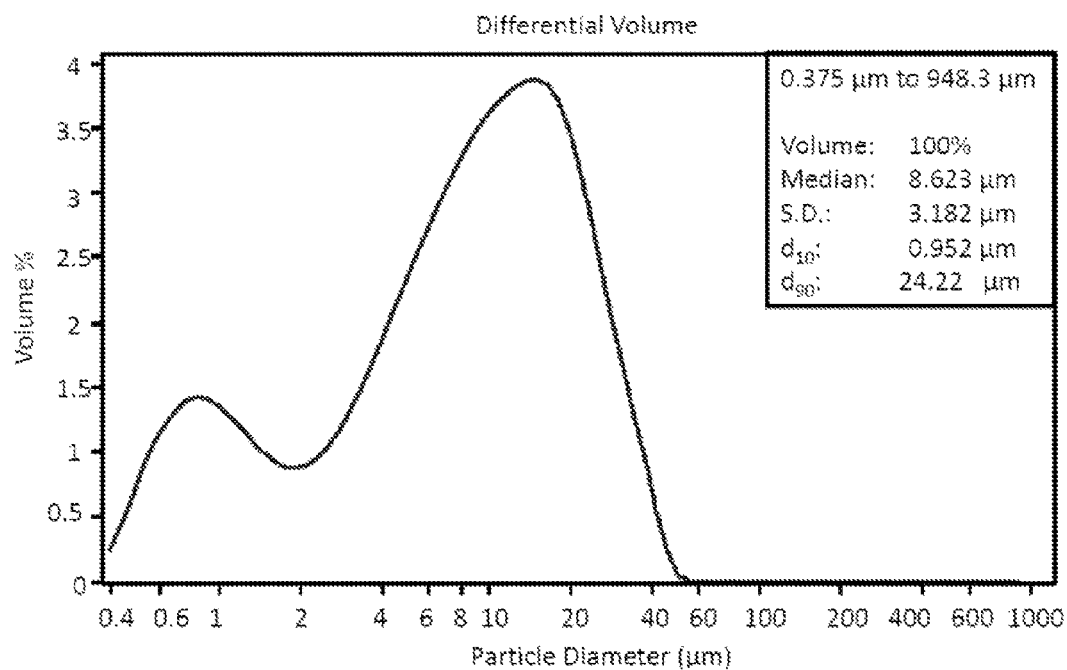
FIG. 1 illustrates sulfur particle size distribution for an aqueous suspension of elemental sulfur particles (Octacure® 750 from Tiarco Chemical Company, Dalton, Ga.) having an average particle size of less than 45 microns.

When describing the metal sorbent compositions and methods of making and using such compositions, the following terms have the following meanings unless otherwise indicated.

"Adsorption capacity" refers to the maximum amount of a substance adsorbed by an adsorbent substrate that is reached in a saturated suspension or solution of the adsorbed substance.

"Average particle size" refers to the average approximate diameter of a particle, where 50% of the particles have a larger approximate diameter, and the other 50% have a smaller approximate diameter. Hence the average particle size can be denoted as d50. As the actual distribution of particle sizes around the average (d50) can vary, other diameters can be used in addition to d50 to describe compositions with specific particle size distributions (PSD). Diameters in addition to d50 include d10 and d90. The definition of d10 is that diameter where 10% of the particles have a smaller approximate diameter (and hence the remaining 90% is coarser). The definition of d90 is that diameter where 90% of the particles have a smaller approximate diameter (and hence the remaining 10% is coarser). Values for other PSDs can be similarly derived.

"Dispersing agent" refers to a surface-active substance added to a mixture or suspension to improve the separation of particles and to reduce or otherwise prevent settling or clumping.

"Dispersion" refers to a substance composed of microfine particles of one material (the dispersed phase) evenly and stably distributed on or throughout another material (the continuous phase).

"Effective amount" refers to the administration of that amount to a fluid, either in a single amount, or as part of a series of the same or different amounts, is effective to capture one or more metals from the fluid, and is sufficient to effect such treatment for removing some or substantially all of the metal contaminant from the fluid. The "effective amount" will vary depending on the metal sorbent composition, the metal or metals to be removed, the severity of metal contamination, and the amount and nature of the fluid to be treated. Usually, the "effective amount" is the amount of metal sorbent composition added to a fluid that produces a adduct comprising the metal sorbent and the captured metal thereon, where the leachate from the adduct contains less than about a hazardous waste amount of the contaminating metal as measured by the Toxicity Characteristic Leaching Procedure (TCLP).

"Fluid" refers to a gas, liquid or vapor, and combinations thereof.

"Metal Contaminant" refers to any metal contaminant in a fluid, and more specifically to a bio-hazardous metal present at contaminating or otherwise bio-hazardous levels in a fluid, where the metal may be present in the fluid in an elemental, ionic, or complexed form, including combinations thereof. Mercury is an example, where the mercury may be in a form selected from elemental, ionic, complexed, and combinations thereof.

"Toxicity Characteristic Leaching Procedure" or "TCLP" refers to the standard U.S. Government (Environmental Protection Agency publication SW-846) leaching test method used in part to characterize waste as either hazardous or non-hazardous for the purpose of disposal.

DESCRIPTION OF THE SPECIFIC EMBODIMENTS

The present invention relates in general to metal sorbent compositions and methods of production, as well as use of the compositions for the removal of contaminant metals, namely mercury, cadmium, lead, silver, gold and other metals or metal ions from fluids. The metal sorbent compositions include an effective amount of a dispersion of microfine elemental sulfur particles supported on an adsorbent substrate. Addition of a metal capture enhancing agent such as a halogen source and/or oxidizing agent in combination with these especially fine and active elemental sulfur particles surprisingly provides improvements for removal of the metal contaminants, and in some embodiments a synergistic improvement for removal of the metal contaminants. The metal capture enhancing agent may be provided as an isolated gas, liquid, and/or solid in the composition, as well as on the same or a separate adsorbent substrate from the elemental sulfur particles. The subject metal sorbent compositions may also include one or more additional components that may be provided with the metal sorbent composition alone or in combination with other components. The one or more additional components may be each individually provided in any suitable form capable of increasing the utility of the subject metal sorbent compositions, such as improving storage stability, handling properties, enhancing metal capture performance, and the like.

A featured aspect of the invention relates to compositions produced by aqueous impregnation and drying of a dispersion of microfine particles of elemental sulfur on an adsorbent support for metals separation, and their use in a process for the removal of metal contaminants from a fluid. An exemplary metal sorbent composition related to this aspect of the invention comprises an effective amount of an aqueous dispersion of microfine elemental sulfur particles supported on an adsorbent substrate, and optionally, a metal capture enhancing agent, such as a metal capture enhancing agent selected from a halogen source, an oxidizing agent, and combinations thereof, where the metal capture enhancing agent is present in an amount having a metal capture enhancing effect on the metal sorbent composition. A specific metal sorbent composition of interest comprises an effective amount of an aqueous dispersion of microfine elemental sulfur particles dried on the surface of an adsorbent substrate. Such a composition can be prepared by a method comprising the steps of (a) applying a metal capturing effective amount of an aqueous suspension of microfine elemental sulfur particles onto an absorbent substrate under conditions to form a mixture, the mixture comprising a dispersion of the particles supported on the surface of the substrate; and (b) drying the mixture to produce the metal sorbent composition.

Another featured aspect relates to metal sorbent compositions where at least one metal capture enhancing agent is provided on a separate support from the sulfur particles, and methods of their production and use in a process for the removal of metal contaminants from a fluid. Metal sorbent compositions in accordance with this feature comprise a metal capturing effective amount of (a) elemental sulfur particles supported on a first adsorbent substrate particle, and (b) a metal capture enhancing agent supported on a second adsorbent substrate particle, where the elemental sulfur particles and the metal capture enhancing agent are present in a weight ratio having a metal capture enhancing effect on the metal sorbent composition, and where the first and second adsorbent substrate particles are comprised of the same or different material. Such metal sorbent compositions can be prepared by a method comprising: admixing a metal capturing effective amount of (a) elemental sulfur particles supported on a first adsorbent substrate particle, and (b) a metal capture enhancing agent supported on a second adsorbent substrate particle, where the elemental sulfur particles and the metal capture enhancing agent are present in a weight ratio having a metal capture enhancing effect on the metal sorbent composition, and where the first and second adsorbent substrate particles are comprised of the same or different material.

As described above, metal capture enhancing agents of particular interest are selected from a halogen source, an oxidizing agent, and combinations thereof. In one aspect, the halogen source and the oxidizing agent may each individually be provided in the composition (i) as a separate or otherwise isolated gas, liquid or solid, (ii) on the first adsorbent substrate with the elemental sulfur particles, (iii) on the second adsorbent substrate, (iv) on one or more additional substrates, or (v) a combination of (i)-(iv), where the first, second, and one or more additional adsorbent substrates may be composed of the same or different material. For example, of specific interest is a metal sorbent composition where a dispersion of microfine elemental sulfur particles are supported on the first adsorbent substrate, the halogen source is supported on the second adsorbent substrate, and the oxidizing agent is supported on a third adsorbent substrate, where the first, second, and third adsorbent substrates may be composed of the same or different material.

Yet another featured aspect of the invention is a method of removing a metal contaminant from a fluid. This method comprises the steps of (a) contacting the fluid with a metal capturing effective amount of a metal sorbent composition of the invention; (b) forming an adduct comprising the metal sorbent composition and one or more metal contaminants of the fluid; and (c) removing the adduct. Compositions comprising an adduct produced in accordance with this method also are provided.

An additional feature relates to kits and systems for use in preparing the subject metal sorbent composition for removing a metal contaminant from a fluid. The kits and/or systems include a metal sorbent composition of the invention, and/or precursors for forming the metal sorbent composition. In particular embodiments, the kits include one or more containers each individually comprising as separate or combined components an effective amount of a composition selected from the group consisting of: (i) an aqueous suspension or solution of highly dispersed microfine elemental sulfur particles; (ii) adsorbent substrate particles; (iii) a dispersion of microfine elemental sulfur particles supported on an adsorbent substrate; and (iv) optionally, at least one metal capture enhancing agent, such as one or more of a halogen source, an oxidizing agent, or combinations thereof. When included, the metal capture enhancing agents may be provided in the kits as a gas, liquid, and/or solid, and may each individually be provided in the kit on a support that may be same or different from the adsorbent substrate on which the microfine elemental sulfur particles are or to be supported.

One exemplary kit comprises as components: (a) a first container containing a first composition, the first composition comprising an aqueous suspension or solution of highly dispersed microfine elemental sulfur particles; and (b) a second container containing a second composition, the second composition comprising adsorbent substrate particles. In this embodiment, the first and second containers may each individually further include one or more additional agents, such as a metal capture enhancing agent, and the kit may optionally include one or more additional containers containing at least one metal capture enhancing agent. A second exemplary kit comprises as components: (a) a first container containing an effective amount of a metal sorbent composition comprising an aqueous dispersion of microfine elemental sulfur particles supported on an adsorbent substrate, and (b) a second container containing at least one metal capture enhancing agent in an amount sufficient to enhance the metal capture efficiency of the metal sorbent composition. Here again, the first and second containers may each individually further include one or more additional agents, and the kit may optionally include one or more additional containers containing at least one of such agents. As such, in certain embodiments a kit of the invention may include as components: (a) a first container containing a metal capturing effective amount of a first composition, the first composition comprising an aqueous suspension or solution of highly dispersed microfine elemental sulfur particles that is optionally supported on a first adsorbent substrate particle; and (b) one or more additional containers each individually containing at least one metal capture enhancing agent that is optionally supported on a second adsorbent substrate particle.

The compositions and methods of the invention are practical, robust, and economical, and significantly reduce many of the undesirable health, safety and environmental factors associated with the preparation and use of prior metal removal systems. In addition, the subject compositions provide outstanding metal removal performance, and find particular use in capturing mercury from coal-fired flue gas.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing the subject invention, the subject metal sorbent compositions and methods of production are described first in greater detail, followed by a review of representative applications in which the compositions find use, as well as a review of kits and systems that find use in making or using the subject metal sorbent compositions.

Metal Sorbent Compositions

As summarized above, the subject invention provides metal sorbent compositions that include an effective amount of a dispersion of microfine elemental sulfur particles supported on an adsorbent substrate. The subject compositions are prepared under conditions that form a dispersion of the particles on the surface of the adsorbent substrate, such as by applying and drying an aqueous suspension of the microfine elemental sulfur particles on the substrate.

In many embodiments, the subject metal sorbent compositions include a metal capture enhancing agent such as a halogen source and/or oxidizing gent in an amount that provides a metal capture enhancing effect on the composition. At particular weight ratios of elemental sulfur to metal capture enhancing agent, the unexpected effect of increasing the metal capturing efficiency significantly increases to a desired level, thereby increasing the utility of the metal sorbent compositions. The metal capture enhancing agent may be provided as (i) a free composition in the absence of a support, (ii) on the same or a separate support from the sulfur particles in the composition, or (iii) combinations thereof. In specific embodiments, the metal capture enhancing agent is advantageously provided on a separate support from the sulfur particles, which further increases the utility of the subject metal sorbent compositions. Inclusion of one or more different metal capture enhancing agents in the subject metal sorbent compositions is also provided.

Thus the metal sorbent compositions in general include an effective amount of a dispersion of microfine elemental sulfur particles supported on an adsorbent substrate, and in many embodiments further include a metal capture enhancing agent, such as a metal capture enhancing agent selected from a halogen source, an oxidizing agent, and combinations thereof. As described above, multiple possible combinations are contemplated when one or more metal capture enhancing agents is included in the subject metal sorbent compositions. In each instance, the metal sorbent composition comprising a dispersion of elemental sulfur particles supported on an adsorbent substrate, and the optional metal capture enhancing agent are each provided in an effective amounts in the as-applied metal sorbent composition so as to be capable of removing a desired level of one or more metal contaminants from a target fluid, such as illustrated in the Experimental section.

The subject metal sorbent compositions are characterized by being capable of removing metal contaminants from a fluid, such as a gas, including combustion gases and vaporized streams, where binding of the metal contaminant to the subject composition is exceptionally strong and recalcitrant to leaching once bound. The metal contaminant is in general an ionic or metallic contaminant, such as at least one or more of the following: antimony, arsenic, bismuth, cadmium, cobalt, copper, chromium, gold, indium, iron, lead, manganese, molybdenum, mercury, nickel, platinum, silver, tin, tungsten, titanium, vanadium, zinc, zirconium and mixtures thereof. In a featured embodiment, the metal contaminant is mercury. The contaminated fluid may be a liquid, but in representative embodiments is essentially a gas, such as a combustion gas, including a combustion gas such as power plant flue gas, including coal-fired flue gas. Combustion gases that embody flue gases in addition to coal-fired flue gas include gases from natural fuel sources, such as oil, natural gas and the like. Thus in some embodiments, the gas comprises hydrocarbons and the like.

A further aspect of the subject compositions is that by employing an aqueous mixture of the microfine elemental sulfur particles to prepare the compositions, exposure to dry milling of dusty, explosive fine powders can be avoided. Specifically, use of an aqueous suspension of the microfine elemental sulfur particles to prepare the compositions the subject invention overcomes one or more problems associated with conventional metal sorbents, their preparation and use including, but not limited to: 1) solvents or flammable solvents, 2) dry milling dusty, explosive fine powders, 3) complex oxidation reduction chemistry, 4) relatively high temperature processing, and 5) vapor infiltration processes.

As described above, the subject metal sorbent compositions are prepared by combining or mixing an adsorbent substrate with elemental sulfur particles. As also described above, the subject metal sorbent compositions may optionally include a metal capture enhancing agent, such as a halogen source, oxidizing agent, and combinations thereof. Each of these precursor components or compositions is now reviewed separately in greater detail.

Elemental Sulfur Particles

The sulfur component of the subject metal sorbent compositions comprises microfine particles of elemental sulfur ($S_8$). By "microfine particles of elemental sulfur" is intended to mean elemental sulfur having an average particle size that is in or less than the double digit micron range (i.e., less than about 100 microns, including about 90, 80, 70, 60, and 50 microns or less), including in or less than the single digit micron range (i.e., less than about 10 microns). Elemental sulfur having an average particle size that is in the low double digit micron range (i.e., about 50 microns or less), single digit micron range, submicron range, and combinations thereof, are of particular interest, with particles in the single digit and submicron range being of specific interest. The microfine particles of elemental sulfur of the subject metal sorbent compositions may include a relatively Gaussian distribution of particles around a median, as well as a mixture of particles having various particle size distributions (PSDs), including micron and submicron particle sizes.

In certain embodiments, the metal sorbent composition comprises microfine elemental sulfur particles having an average particle size of less than about 45 microns, usually less than about 35 microns, including less than about 30 microns, and more typically less than about 10 microns. This includes compositions having elemental sulfur particles in the submicron or nanometer range. Of particular interest are metal sorbent compositions prepared with microfine elemental sulfur particles containing at least about 5% by weight (wt-%) (d5), and usually at least about 10% by weight (d10) submicron sized elemental sulfur. For example, in many embodiments, the microfine elemental sulfur particles have a particle size distribution selected from the group consisting of a d10 of about 0.1 to 2.0 microns, a d50 of about 2.0 to 15 microns, and a d90 of about 15 to 35 microns. Thus while the average particle size and distribution may vary, in many embodiments the microfine elemental sulfur particles of the subject compositions have an average particle size of about 0.1 to 45 microns.

In certain embodiments, the microfine elemental sulfur particles are present in an amount that is at least 0.5% by weight of the metal sorbent composition, such as based on the anhydrous weight of the substrate present in the metal sorbent composition. In some embodiments, the microfine elemental sulfur particles are present in an amount that is less than the adsorption capacity of the adsorbent substrate. In many embodiments, this amount is about 1% to 30% by weight of the metal sorbent composition, depending on the adsorbent substrate employed.

The microfine elemental sulfur particles employed in the subject compositions is typically rubber maker's sulfur, in particular, ball milled sulfur, and more particularly activated microfine elemental sulfur particles, such as produced by ball milling under conditions that avoid melting. Microfine elemental sulfur particles produced by ball milling under conditions that avoid melting may be considered "activated elemental sulfur particles." Such activated elemental sulfur particles are characterized as having a metal capturing efficiency that is greater than elemental sulfur particles produced by methods such as sublimation etc., as described herein further below.

In many embodiments, the elemental sulfur particles from which the subject metal sorbent compositions are prepared is provided as an aqueous dispersion of microfine elemental sulfur particles, e.g., an aqueous composition made up of at least an elemental sulfur particle component, and in many embodiments, a dispersing agent component. Thus in certain embodiments, the aqueous dispersion of microfine elemental sulfur particles further comprises a dispersing agent. In one embodiment, the dispersing agent is selected from a surfactant (such as a polyacrylic acid, a detergent, and the like) and a complexing agent (such as chelating agent including EDTA and the like). The sulfur component may further include one or more additional components as well, such as described in more detail below.

In certain embodiments, deposition of the elemental sulfur on the adsorbent substrate is performed with an aqueous dispersion of sulfur in which the average particle size is less than about 45 microns, usually less than about 35 microns, including less than about 30 microns, and more typically less than about 10 microns. In some embodiments, an aqueous dispersion of elemental sulfur containing at least 5% by volume (vol-%) (sometimes designated as dV5) submicron sized elemental sulfur is used. In other embodiments, an aqueous dispersion of elemental sulfur containing at least 10 vol-% (sometimes designated as dV10) submicron sized elemental sulfur is used. Of particular interest are microfine elemental sulfur particles having a particle size distribution in the aqueous suspension selected from d10 of about 0.1 to 2.0 microns, d50 of about 2.0 to 15 microns, and d90 of about 15 to 35 microns. In many embodiments, approximately 10% by volume (vol-%) or dV10 of the sulfur particles in the aqueous dispersion are in the submicron particle size range, see for example, FIG. 1. In another embodiment, the elemental sulfur was subjected to ball milling under conditions to produce micron size particles, as described further below.

There are numerous examples of aqueous dispersions of elemental sulfur particles that can be used to prepare the subject metal sorbent compositions. One example of interest is described in U.S. Pat. No. 7,132,482, which discloses the preparation and use of an aqueous dispersion of elemental sulfur for vulcanizing rubber using complexing agents based on EDTA, NTA, DTPA or HEDTA, or functional polymeric compounds such as polyacrylic acid and salts, ligninsulfonates and/or β-naphthalenesulfonic acid-formaldehyde condensates. Another aqueous dispersion of sulfur of interest is disclosed in U.S. Pat. No. 2,201,124, in which polythionic acids are dispersed with sucrose, maltose, dextrose, glycerine, molasses, glucose, triethylene glycol, diethylene glycol, or propylene glycol. An additional example of interest is Japanese Patent Publication Number JP 62213837, which discloses the use of amine oxide surfactants for forming aqueous dispersions of sulfur. U.S. Pat. No. 4,321,079 reports on making aqueous sulfur dispersions in an ammonia solution. Common physical methods are typified by U.S. Pat. No. 3,799,884 using only pumping and stirring to prepare sulfur suspensions.

Of specific interest is an aqueous dispersion of elemental sulfur particles for use in the preparation of the subject metal contaminant removal compositions is produced by Tiarco Chemical Company under the product name of Octacure 750 (sometimes referred to as O-750) and related compositions. This relatively stable suspension is characterized by the particle size distribution (PDS) shown in FIG. 1, with a d10 of about 0.9 microns, a d50 of about 8.6 microns and d90 of about 24.3 microns. To achieve this uniquely fine PSD, commercial elemental sulfur is ball milled and stabilized in an aqueous suspension using surface active additives and/or other dispersing agents. This intense milling of crystals under conditions that avoid melting is well known to create crystal defects that enhance activity beyond any increases attributable to particle size reduction. For example, a titanium aluminum olefin polymerization catalysts are activated with ball milling, such as disclosed in U.S. Pat. Nos. 3,032,510; 3,688,992; 4,154,899; 4,237,029; and 4,329,253. Another example of a commercial aqueous dispersion of sulfur is offered by Akron Dispersions under the product name of Bostex 378. These aqueous dispersions of extra fine sulfur are used as "rubber maker's sulfur" for the vulcanization of synthetic butadiene rubber (SBR) and Natural rubber latex. Accordingly, in some embodiments, the microfine elemental sulfur particle composition is rubber maker's sulfur, in particular, ball milled sulfur, and more particularly activated microfine elemental sulfur particles, such as produced by ball milling under conditions that avoid melting as described above.

In comparison, more than 12 million tons/year of elemental sulfur is produced in the U.S. using the Claus process to recover sulfur from petroleum products. The Claus process involves the redox reaction of $H_2S$ and $SO_2$. This commercially available elemental sulfur from the Claus process has generally an average particle size of from 75 to 300 microns (See, e.g., Sulfur: At the Crossroads of Energy, the Environment, and Agriculture, Ferrell Neeley, Management Consultant (http://www.gtp-merichem.com/downloads/sulfur_crossroads.pdf)), or more than 10 to 40 times larger than the elemental sulfur particle size generally used in the metal sorbent compositions of the subject invention. Furthermore, elemental sulfur supplied by Martin Resources, Montana Sulphur & Chemical Company, Sulfer Works, Inc. and Tiger Resources Technology, Inc. is sold for agricultural purposes and is designed to reduce dusting with an average particle size greater than 800 microns, which is more than 100 times larger.

In general, the subject metal sorbent compositions have a mercury capture efficiency of greater than about 60%, including up to 100% or greater, relative to an activated carbon control such as a Darco Hg-LH control (Norit Americas Inc., Marshall, Tex., USA), which is an impregnated lignite coal-based activated carbon manufactured specifically for the removal of mercury in coal-fired utility flue gas emission streams. Usually, the subject metal sorbent compositions have a mercury capture efficiency of about 70% to 100% relative to an activated carbon control.

Adsorbent Substrate

The adsorbent substrate component of the metal sorbent composition can be any solid support, carrier, or material capable of supporting elemental sulfur. Specifically, the adsorbent substrate is any carbon or non-carbon based material capable of supporting a dispersion of microfine elemental sulfur particles for removing a metal contaminant from a fluid. The adsorbent substrate can be synthetic, derived from natural sources, or a combination thereof.

In many embodiments, the adsorbent substrate comprises particles of adsorbent substrate, such as particles of a refractory material. Such adsorbent substrate particles may vary in average size, as described further herein, but in representative embodiments have an average particle size of less than about 500 microns, generally less than about 200 microns, typically less than 150 microns, and more typically less than about 100 microns, but usually greater than about 0.001 microns, greater than about 0.01 microns, and typically greater than about 0.1 microns. In many embodiments, the adsorbent substrate particles have an average particle size of about 0.1 to 100 microns, about 1 to 80 or less, such as about 1 to 50 microns, and in some cases about 5 to 15 microns. As such, the adsorbent substrate in many embodiments comprises microfine adsorbent substrate particles. Mixtures of adsorbent substrates with variable average particles sizes and distributions are also contemplated.

In certain embodiments, the adsorbent substrate is further capable binding a metal contaminant. This aspect includes an adsorbent substrate composed of particles of a highly porous refractory material suitable for this purpose, including, but not limited to, particles of activated carbon, silica-based materials and the like. Adsorbent substrates comprising particles of refractory oxides are of particular interest. Examples of refractory oxides include, but are not limited to, silicas, aluminas, aluminosilicates, etc. In specific embodiments, the adsorbent substrate consists essentially of particles of a silica-based adsorbent substrate.

By "silica-based adsorbent substrate" is intended a solid support, carrier, or material having by weight a substantial silica component, such as a zeolite, diatomaceous earth, clay, pumice, perlite, fly ash, and the like. Particles of a silica-based adsorbent substrate comprising a refractory oxide are of particular interest. A featured embodiment is a non-carbon based adsorbent substrate composed essentially of particles of a highly porous silica-based material selected from: a zeolite such as Chabazite, a diatomaceous material such as diatomaceous earth, and combinations thereof.

Thus is many embodiments, the adsorbent substrate is a silicate, an aluminosilicate, a zeolite, an alumina, a mineral, a stable oxide, or mixtures thereof. In some embodiments, the adsorbent substrate consists essentially of diatomaceous earth, fly ash, perlite, pumice, and mixtures thereof. Yet in other embodiments the adsorbent substrate consists essentially of one or more of the following: a synthetic or natural zeolite, Zeolite X, Zeolite Y, Clinoptilolite, Chabazite, Heulandite, and mixtures thereof. In yet other embodiments, the adsorbent substrate is a clay, a phyllosilicate or an alumina phyllosilicate mineral, including montmorillonite, Kaolin and the like, or mixtures thereof. In some embodiments, the adsorbent substrate consists of an activated carbon.

The amount of adsorbent substrate in the metal sorbent composition may vary, where the specific selection of the amount is dependent on the desired application and product parameters desired therefore, such as porosity, surface area metal capture specificity, metal capture efficiency, storage stability, reuse characteristics, and the like. In certain embodiments, the total amount of adsorbent substrate in the metal sorbent composition ranges from about 1 to 99.9% (w/w), such as 50 to 99% (w/w), including 70 to 98.5% (w/w), usually 80 to 97% (w/w), and in some cases 90 to 94% (w/w) in representative embodiments.

In certain embodiments, the adsorbent substrate component may be derivatized to increase it utility. For example, corrugated ceramic materials made from materials such as alumina, silica and magnesia, lithium, etc. may be coated with, for instance, from about 1 to about 20 weight percent thereof of a refractory oxide, such as defined above, prior to impregnation with elemental sulfur particles.

The subject adsorbent substrate component, as described above, may or may not include one or more additional agents, for example, a halogen source, an oxidizing agent, etc, present in it, as desired. When present, the agent(s) may be separate or bound to the same or different substrate, as desired.

Halogen Source

As described above, the subject metal sorbent compositions may optionally include a halogen source. When included, the halogen source may be provided separate from or on the same substrate as the elemental sulfur particles. Of interest is a metal sorbent composition, where the metal sorbent composition further comprises a halogen source, and where the halogen source is supported on the adsorbent substrate, a second adsorbent substrate, or a combination thereof, and wherein the adsorbent substrate and the second adsorbent substrate are the same or different.

The halogen component of the metal sorbent composition includes a halogen atom. Halogens of particular interest include chlorine, bromine, iodine, or combinations thereof. The subject halogen source may or may not include one or more additional components, such as described herein. The halogen source may be provided as a gas, liquid, solid, or combinations thereof. The halogen source is combined to form a metal sorbent composition of the invention by any number of suitable techniques.

In certain embodiments, the halogen source is provided as a gas, which may for example, be applied as gaseous elemental halogen (i) directly to a metal contaminated fluid of interest in combination with a metal sorbent composition of the invention, and/or (ii) to a particular adsorbent substrate of a metal sorbent composition of the invention (for example, bubble in chlorine and/or bromine gas onto an adsorbent substrate of interest at about 0.1 to 5 wt-% of the substrate).

In certain embodiments, the halogen source is provided as a metal or organic complex, usually as a halide. The halide source is applied (i) directly to a metal contaminated fluid of interest in combination with metal sorbent composition of the invention, and/or (ii) to a particular adsorbent substrate of interest. When the halide is a liquid, the liquid halogen source can be an aqueous, organic, or mixed aqueous/organic suspension or solution. Of specific interest are halides consisting essentially of metal or organic chlorides, bromides, iodides, and mixtures thereof. Examples of halides include, but are not limited to, transition metal chlorides such as, CuCl, $CuCl_2$, $FeCl_2$, $FeCl_3$, $ZnCl_2$, $NiCl_2$, $MnCl_2$, $TiCl_3$, $TiCl_4$ or reactive chlorides including but not limited to $AlCl_3$, $SnCl_4$ or partially hydrolyzed metal chlorides or $NH_4Cl$, or HCl and mixtures there of, and the like. Further examples include bromides that include, but are not limited to NaBr, KBr, $CaBr_2$, $MgBr_2$, $LiB_2$, CuBr, $CuBr_2$, $FeBr_2$, $FeBr_3$, $ZnBr_2$, $NiBr_2$, $MnBr_2$, HBr, partially hydrolyzed derivatives thereof, and mixtures thereof. As such, in certain embodiments, the halide is selected from one or more of CuCl, $CuCl_2$, $FeCl_2$, $FeCl_3$, $ZnCl_2$, $NiCl_2$, $MnCl_2$, $TiCl_3$, $TiCl_4$, $AlCl_3$, $SnCl_4$, $NH_4Cl$, HCl, NaBr, KBr, $CaBr_2$, $MgBr_2$, $LiB_2$, CuBr, $CuBr_2$, $FeBr_2$, $FeBr_3$, $ZnBr_2$, $NiBr_2$, $MnBr_2$, HBr, partially hydrolyzed derivatives thereof, and mixtures thereof. Of specific interest is a halide selected from $ZnCl_2$, $AlCl_3$, $FeCl_3$ and $CaBr_2$, or partially hydrolyzed derivatives thereof, and mixtures thereof. Such halides are commercially available, such as from Sigma-Aldrich (St. Louis, Mo., USA) or from ICL-IP America (Morgan City, La.).

The amount of halogen source component in the metal sorbent composition may vary, where the specific selection of concentration is dependent on the desired application and product parameters desired, such as metal capture specificity, metal capture efficiency, storage stability, and use characteristics of the adduct generated upon metal capture. The halogen source is generally present in an amount that is at least about 0.1% by weight of the metal sorbent composition. The halogen source sometimes ranges from about 0.1 to about 30% (w/w), including from about 0.5 to about 20% (w/w), such as from about 1 to about 20% (w/w), from about 1 to about 15% (w/w), including from about 1 to 10% (w/w), from about 1.0 to 5% (w/w), and often about 0.5 to 3% (w/w). In certain embodiments, the halogen source is present in an amount that is less than the adsorption capacity of the metal sorbent composition. Thus in many embodiments, the halogen source is present in an amount selected from about 0.1% up to about 30% by weight of the metal sorbent composition, where fractional increments and overlapping ranges of such amounts are contemplated.

As discussed above, certain ratios of halogen source to elemental sulfur particles result in a metal sorbent composition which exhibits enhanced metal capturing effects, and in many embodiments, the halogen source is provided as a free component, supported on a substrate such as an adsorbent substrate described above, and/or combinations thereof. Thus in certain embodiments, the halogen source component and elemental sulfur particle component are present in a weight ratio that provides a metal capture enhancing effect on the metal sorbent composition. In some embodiments, the halogen source component and elemental sulfur particle component are present in a weight ratio that provides a synergistic metal capture enhancing effect on the metal sorbent composition. By "synergistic metal capture enhancing effect" is meant a metal capture enhancing effect produced by the interaction of two or more components that is greater than the sum of the metal capture effect produced by each component in the absence of the other.

Typically, the halogen source and elemental sulfur particle components are present in the metal sorbent composition at a weight ratio of halogen source to elemental sulfur particles from about 100:1 to 1:100. Certain ratios of halogen source and elemental sulfur particles result in a metal sorbent composition which exhibits improved metal capture effects of particular interest. For example, in a metal sorbent composition comprising metal capture enhancing amounts of a halogen source, such as $ZnCl_2$, $AlCl_3$, $FeCl_3$ and $CaBr_2$, and elemental sulfur particles, such as microfine elemental sulfur particles having an average particle size of less than about 45 microns, the weight ratio of the halogen source to sulfur is generally from about 75:1 up to about 1:75, including 50:1 to 1:50, usually from about 20:1 to 1:20, and more usually from about 10:1 to 1:10, including weight ratios of about 5:1 to 1:5, such as about 2:1 to 1:2, or 1:1. The amount of halogen source and elemental sulfur particles are usually present in similar proportions subject to the stoichiometry of the halogen to sulfur atoms and the performance effect sought. In addition, certain ratios of halogen source and elemental sulfur particles result in a metal sorbent composition which exhibits synergistic metal capture enhancing effect. As such, the weight percent of halogen source in the metal sorbent composition is generally selected so as achieve the desired ratio and performance effect, such as described in the Experimental section.

In a featured embodiment, the halogen source component of the metal sorbent composition is immobilized or supported on a support. The halogen source support can be any solid support, carrier, or material capable of supporting the halogen source and suitable for removing a metal contaminant from a fluid. The halogen source support can be synthetic or derived from natural sources. In general, the halogen source support is an adsorbent substrate, such as an adsorbent substrate as described above. As such, the halogen source may be supported on the same or different support as the adsorbent substrate supporting the elemental sulfur particles in the metal sorbent compositions.

In another featured embodiment, the halogen source is provided as or applied onto a support that is physically separate or otherwise isolated from support supporting the microfine elemental sulfur particles (for example, the halogen source and the sulfur particles are supported on different particles in the composition, where the particles can be composed of the same or different material). An additional featured embodiment is where the halogen source is provided as or applied onto a support as gaseous elemental halogen, as described above. In yet another featured embodiment, the halogen source is provided as or applied onto a support as an aqueous solution, such as described above in the preparation of the metal sorbent compositions comprising the microfine elemental sulfur particles. In these embodiments, the support or adsorbent substrate can be the same or different from the support or substrate supporting the elemental sulfur, and each individually can be provided on the same or different support, e.g., the elemental sulfur is supported on a first substrate particle, and the halogen source is supported on a second substrate particle, where the first and second substrate particles are comprised of the same or different material. Put differently, the halide source can be applied to a virgin substrate not previously containing sulfur, and then the first substrate containing the sulfur and the second containing the halogen source are physically mixed to form the metal sorbent composition of interest. Here again, the amount of halogen source component on a support in the metal sorbent composition may vary, where the specific selection of concentration is dependent on the desired application and product parameters desired, such as metal capture specificity, metal capture efficiency, storage stability, and reuse characteristics of the residue generated upon metal capture.

In general, the amount of the halogen source on a support is provided in the metal sorbent compositions of the invention as described above, usually added in the amount of at least 0.1 weight percent, based on the anhydrous weight of the substrate or substrates. In specific embodiments, the halogen source is a halide source consisting essentially of metal bromides, including but not limited to, NaBr, KBr, $CaBr_2$, $MgBr_2$, CuBr, $CuBr_2$, $FeBr_2$, $FeBr_3$, $ZnBr_2$, $NiBr_2$, and $MnBr_2$, or non-metal bromides such as HBr or $NH_4Br$, or mixtures thereof, applied to a substrate. In one embodiment, the halide is a chloride source selected essentially from transition metal chlorides including, CuCl, $CuCl_2$, $FeCl_2$, $FeCl_3$, $NiCl_2$, $MnCl_2$, $TiCl_3$. $TiCl_4$ or reactive chlorides, including but not limited to, $AlCl_3$, $SnCl_4$ or partially hydrolyzed metal chlorides or $NH_4Cl$, or HCl and mixtures there of, applied to a substrate. In specific embodiments, the halide is $ZnCl_2$, $AlCl_3$ (partially hydrolyzed), $FeCl_3$ and $CaBr_2$, or combinations thereof, added in the amount of at least 0.1 weight percent, such as based on the anhydrous weight of the substrate present in the metal sorbent composition.

Oxidizing Agent

As described above, the subject metal sorbent compositions may optionally include an oxidizing agent. When included, the oxidizing agent may be provided separate from or on the same substrate as the elemental sulfur particles. Of interest is a metal sorbent composition, where the metal sorbent composition further comprises an oxidizing agent, and where the oxidizing agent is supported on the adsorbent substrate, a second adsorbent substrate, or a combination thereof, and wherein the adsorbent substrate and the second adsorbent substrate are the same or different. Thus in certain embodiments, the metal sorbent composition comprises an oxidizing agent that is separated from the adsorbent substrate on which the elemental sulfur particles are supported. Separation of the oxidizing agent and the elemental sulfur particles in the metal sorbent compositions avoids unwanted reactions, thereby increasing the storage stability and the effective metal capture activity of the compositions in general.

The oxidizing agent component of the metal sorbent composition is in general an agent capable generating free mercury ions from elemental mercury, such as the oxidizing agents described in U.S. Pat. No. 6,521,131 or U.S. patent application publication number 2001/0007647A1. Particular examples include, but are not limited to, hypochlorite and other hypohalite compounds such as bleach, perchlorate, peroxide, permanganate, hexavalent chromium compounds such as chromic and dichromic acids, chromium trioxide, pyridinium chlorochromate, and chromate/dichromate compounds, osmium tetroxide, and the like, as well as salts thereof. In representative embodiments, the oxidizing agent is hypochlorite, peroxide, permanganate, or combinations thereof.

As such, the oxidizing agent in certain embodiments also comprises a halogen source, such as chlorine and other halogens, including oxidizing agents such as chlorite, chlorate, perchlorate, and other analogous halogen-containing compounds. In other embodiments, the oxidizing agent is a halogen. In some embodiments, the oxidizing agent is devoid of a halogen source, for example, an oxidizing agent such as peroxide, permanganate, and the like. Put differently, the oxidizing agent and the halogen source may be the same, whereas in other embodiments they are different. Combinations of the above oxidizing agents may also be employed in the subject metal sorbent compositions. Thus the subject oxidizing agent may or may not include one or more additional components, such as described herein. Such oxidizing agents are commercially available, such as from Sigma-Aldrich (St. Louis, Mo., USA) or from ICL-IP America (Morgan City, La.).

The amount of oxidizing agent component in the metal sorbent composition may vary, where the specific selection of concentration is dependent on the desired application and product parameters desired, such as metal capture specificity, metal capture efficiency, storage stability, and use characteristics of the adduct generated upon metal capture. The oxidizing agent is generally present in an amount that is at least about 0.1% by weight of the metal sorbent composition. The oxidizing agent sometimes ranges from about 0.1 to about 30% (w/w), including from about 0.5 to about 20% (w/w), such as from about 1 to about 20% (w/w), from about 1 to about 15% (w/w), including from about 1 to 10% (w/w), from about 1.0 to 5% (w/w), and often about 0.5 to 3% (w/w). In certain embodiments, the oxidizing agent is present in an amount that is less than the adsorption capacity of the metal sorbent composition. Thus in many embodiments, the oxidizing agent is present in an amount selected from about 0.1% up to about 30% by weight of the metal sorbent composition, where fractional increments and overlapping ranges of such amounts are contemplated.

As discussed above, certain ratios of oxidizing agent to elemental sulfur particles result in a metal sorbent composition which exhibits enhanced metal capturing effects, and in many embodiments, the oxidizing agent is provided as a free component, supported on a substrate such as an adsorbent substrate described above, and/or combinations thereof. Thus in certain embodiments, the oxidizing agent component and elemental sulfur particle component are present in a weight ratio that provides a metal capture enhancing effect on the metal sorbent composition. In some embodiments, the oxidizing agent component and elemental sulfur particle component are present in a weight ratio that provides a synergistic metal capture enhancing effect on the metal sorbent composition.

Typically, the oxidizing agent and elemental sulfur particle components are present in the metal sorbent composition at a weight ratio of oxidizing agent to elemental sulfur particles from about 100:1 to 1:100. Certain ratios of oxidizing agent and elemental sulfur particles result in a metal sorbent composition which exhibits improved metal capture effects of particular interest. For example, in a metal sorbent composition comprising metal capture enhancing amounts of an oxidizing agent, such as peroxide or permanganate, and elemental sulfur particles, such as microfine elemental sulfur particles having an average particle size of less than about 45 microns, the weight ratio of the halogen source to sulfur is generally from about 75:1 up to about 1:75, including 50:1 to 1:50, usually from about 20:1 to 1:20, and more usually from about 10:1 to 1:10, including weight ratios of about 5:1 to 1:5, such as about 2:1 to 1:2, or 1:1. The amount of oxidizing agent and elemental sulfur particles are usually present in similar proportions subject to the stoichiometry of the oxidizing agent to sulfur atoms and the performance effect sought. In addition, certain ratios of oxidizing agent and elemental sulfur particles result in a metal sorbent composition which exhibits synergistic metal capture enhancing effect. As such, the weight percent of oxidizing agent in the metal sorbent composition is generally selected so as achieve the desired ratio and performance effect, such as described in the Experimental section.

The oxidizing agent is combined to form a metal sorbent composition of the invention by any number of suitable techniques. In one embodiment, the oxidizing agent is applied (i) directly to a metal contaminated fluid of interest in combination with metal sorbent composition of the invention, and/or (ii) to a particular adsorbent substrate of interest. When the oxidizing source is a liquid, the liquid can be an aqueous, organic, or mixed aqueous/organic suspension or solution. In a featured embodiment, the oxidizing agent is provided as or applied onto a support that is physically separate from the support supporting the microfine elemental sulfur particles. An additional embodiment involves the application of the oxidizing agent as a gas. In yet another featured embodiment, the oxidizing agent is provided as or applied onto a support as an aqueous solution, such as described above in the preparation of the metal sorbent compositions comprising the microfine elemental sulfur particles. In these embodiments, the support or adsorbent substrate can be the same or different from the support or substrate supporting the elemental sulfur, and each individually can be provided on the same or different support, e.g., the elemental sulfur is supported on a first substrate particle, and the oxidizing agent is supported on a second substrate particle, where the first and second substrate particles are comprised of the same or different material. Put differently, the oxidizing agent can be applied to a virgin substrate not previously containing sulfur, and then the first substrate containing the sulfur and the second containing the oxidizing agent are physically mixed to form the metal sorbent composition of interest. Here again, the amount of the oxidizing agent component on a support in the metal sorbent composition may vary, where the specific selection of concentration is dependent on the desired application and product parameters desired, such as metal capture specificity, metal capture efficiency, storage stability, and reuse characteristics of the residue generated upon metal capture. This approach is particularly useful for adding an oxidizing agent on a separate support to improve capture of elemental mercury. For instance, the oxidizing agent can react to foster an unwanted redox reaction during the preparation or storage of a metal sorbent composition comprising microfine elemental sulfur particles, particularly when both are placed on the same support or within sufficient proximity or under conditions sufficient to foster the unwanted redox reaction. By placing the oxidizing agent on a separate support from the elemental sulfur particles, the unwanted redox reaction is significantly avoided.

In general, the amount of the oxidizing agent on a support is provided in the metal sorbent compositions of the invention as described above, usually added in the amount of at least 0.1 weight percent, based on the anhydrous weight of the substrate or substrates. In specific embodiments, the oxidizing agent is an oxidizing agent that is applied to a substrate.

Other Components

The above described compositions may, in certain embodiments, includes one or more optional components that modify the properties of the metal sorbent composition produced from combining the adsorbent substrate and elemental sulfur particles. Representative additional components of interest include, but are not limited to, catalyst (e.g., metals such as in U.S. Pat. No. 4,814,152), one or more additional metal sorbent agents (e.g., alumina or used Claus catalyst alumina such as in U.S. Pat. No. 7,341,667) and the like.

Methods of Production

As described above, the subject invention provides metal sorbent compositions that include an effective amount of a dispersion of microfine elemental sulfur particles supported on an adsorbent substrate. The subject compositions are prepared under conditions that form a dispersion of the particles on the surface of the adsorbent substrate, i.e., the elemental sulfur particles are in essence evenly distributed and stable.

In one embodiment, a method of producing metal sorbents comprising an aqueous dispersion of elemental sulfur particles supported on an adsorbent substrate is provided. These particular metal sorbent compositions comprises an effective amount of an aqueous dispersion of microfine elemental sulfur particles supported on an adsorbent substrate, and optionally, a metal capture enhancing agent such as a halogen source and/or an oxidizing agent in an amount having a metal capture enhancing effect on the metal sorbent composition. In many embodiments, the adsorbent substrate itself is comprised of particles, including microfine particles of adsorbent substrate. In this aspect, the metal sorbent composition can be prepared essentially as free flowing dry powder, and in many embodiments, the aqueous dispersion of microfine elemental sulfur particles is adsorbed and/or effectively dried on the surface of the adsorbent substrate.

In particular, the subject metal sorbent compositions can be prepared by (a) applying a metal capturing effective amount of an aqueous suspension of microfine elemental sulfur particles onto an absorbent substrate under conditions to form a mixture, the mixture comprising a dispersion of the particles supported on the surface of the substrate; and (b) drying the mixture to produce the metal sorbent composition.

By "drying" is intended the mixture in step (a) of the subject method is prepared or otherwise treated under conditions so as to obtain a dry composition that contains less than about 30% water moisture content and is essentially dry in appearance. As such, the drying may include preparing the mixture as essentially an anhydrous composition, as well as a mixture that includes up to about 30% water moisture content. By "anhydrous composition" is meant a composition with less than about 5% water content. For example, drying may include conditions that produce a mixture consisting of about 5%-30% water moisture content, such as about 15-20% water moisture content, as may be achieved by preparing or otherwise allowing an essentially anhydrous metal sorbent composition of the invention to sit exposed to air and equilibrate with the water moisture in the air.

Accordingly, drying can be achieved by either active and/or passive methods that are part of and/or separate from the applying of the aqueous dispersion of elemental particles on the adsorbent substrate, including heating, vacuum, exposure at room temperature under standard atmospheric conditions, or by any method sufficient to achieve a composition that is essentially dry in appearance. This includes applying an aqueous suspension of microfine elemental sulfur particles onto an absorbent substrate composed of microfine particles at an amount that is less than the adsorption capacity of the adsorbent substrate such that the resultant composition is essentially a free flowing powder that is dry in appearance. Of course drying can be carried out by any combination of such approaches. In specific embodiments, the drying comprises heating.

An embodiment of specific interest in where the applying and the drying are each individually at a temperature less than about the melting point of the microfine elemental sulfur particles, such as where the applying is at a temperature of about 10° C. to 50° C., and the drying is at a temperature of about 50° C. to 105° C. In one embodiment, the applying involves coating the adsorbent substrate with the aqueous dispersion of microfine elemental sulfur particles in an amount less than the water adsorption capacity of the adsorbent substrate such that the mixture remains essentially free flowing and dry in appearance. The applying includes, but is not limited to, placing, dropping and/or spraying the aqueous dispersion and the like. In a particular embodiment, the applying comprises spraying the aqueous dispersion of microfine elemental sulfur particles onto the adsorbent substrate. In certain embodiments, the method further comprises applying a metal capture enhancing agent to the adsorbent substrate or adding metal capture enhancing agent in an amount having a metal capture enhancing effect on the metal sorbent composition. The metal capture enhancing agent, such as a halogen source and/or oxidizing agent, can be added separately, applied to the same or different adsorbent substrate as the elemental sulfur particles, or a combination thereof.

In another embodiment, a method of producing metal sorbents comprising multi-substrate compositions is provided. This method involves: admixing a metal capturing effective amount of (a) elemental sulfur particles supported on a first adsorbent substrate particle, and (b) a metal capture enhancing agent supported on a second adsorbent substrate particle, where the elemental sulfur particles and the metal capture enhancing agent are present in a weight ratio having a metal capture enhancing effect on the metal sorbent composition, and where the first and second adsorbent substrate particles are comprised of the same or different material. Also provided are multi-substrate metal sorbent compositions produced by this method, which comprises a mixture of the first and second adsorbent substrate particles.

For example, as described above, in some embodiments, the multi-substrate metal sorbent composition comprises a metal capturing effective amount of (a) elemental sulfur particles supported on a first adsorbent substrate particle, and (b) a halogen source such as a halide supported on a second adsorbent substrate particle, where the elemental sulfur particles and the halogen source are present in a weight ratio having a metal capture enhancing effect on the metal sorbent composition, and where the first and second adsorbent substrate particles are comprised of the same or different material. A featured aspect is where the first and second adsorbent substrate particles are comprised of a different material, such as elemental sulfur particles supported on a zeolite support such as Chabazite, and a halogen source such as $ZnCl_2$, $AlCl_3$ (which is optionally partially hydrolyzed), $FeCl_3$ and/or $CaBr_2$, supported on a molecular sieve support or a silica-based support, including a diatomaceous support such as diatomaceous earth or other suitable supports described above. Another featured aspect is where an oxidizing agent such as peroxide or permanganate is provided in the composition on a third adsorbent substrate particle that may be comprised of the same or different material from the first and second adsorbent substrate particles in this instance.

Methods of Use and Compositions Produced

The subject metal sorbent compositions find use in a method of removing a metal contaminant from a fluid. The method generally involves: (a) contacting the fluid with a metal capturing effective amount of a metal sorbent composition of the invention; (b) forming an adduct comprising the metal sorbent composition and one or more metal contaminants of the fluid; and (c) removing the adduct. In general, the removing involves capturing some or substantially all of a metal contaminant in the adduct. Usually, removing involves using a sufficient amount of the metal sorbent composition such that the fluid once treated is rendered generally less-hazardous or non-hazardous with respect to the metal contaminant targeted for removal.

As described above, the metal contaminant can be of a variety, with mercury being of particular interest. In as many embodiments, the fluid is a hydrocarbon liquid or a gas, such as natural gas, a combustion gas, including a flue gas. In a specific embodiment, the flue gas is coal-fired flue gas, and the adduct is a component of treated fly ash produced by treating coal-fired flue gas with a metal sorbent composition of the invention, and recovering the treated fly ash comprising the adduct, i.e., a mixture comprising fly ash produced from the coal combustion process and the metal sorbent adduct. In a related embodiment, leachate from the adduct and/or treated fly ash contains less than about 0.2 parts per million (ppm) mercury as measured by the Toxicity Characteristic Leaching Procedure (TCLP). Compositions comprising an adduct produced by the metal removing methods of the invention are also of interest. A composition of specific interest comprises or otherwise includes the treated fly ash comprising the adduct, having about 0.1% to 10% by weight of a subject metal sorbent composition of the invention, which can be safely used as a low cost additive or filler in various products including cement such as Portland cement or Asphalt concrete, plastic, geopolymers, bricks and the like.

The subject metal sorbent compositions are employed in methods where a quantity of the metal sorbent composition is delivered to a particular site or location of a fluid stream, or fluid in need thereof. The fluid stream or fluid in need thereof is typically a "gas," where this term is used broadly to describe any gaseous or vaporized substance comprising one or more metal contaminants. In many embodiments, the gas is a combustion gas from waste incineration or a power source generator, such as a combustion gas of a coal-fired power plant (also referred to herein as coal-fired flue gas).

The quantity that is delivered to the fluid in any given application will necessarily vary depending on the nature of the application and use of the composition, is generally and an amount effective to remove some or an amount of one or more contaminating metals to a level that is substantially non-hazardous. The effective amount can be routinely determined such as described in the Experimental section. For example, in certain representative embodiments involving removal of mercury from coal-fired flue gas, the effective amount of the metal sorbent composition added to the flue gas ranges from about 0.1 to about 100 lbs for every 1 million actual cubic feet (acf) of the contaminated flue gas, such as from about 1 to about 50 lbs per 1 million acf, including from about 1 to about 25 lbs per 1 million acf, and more particularly from about 0.5 to 10 lbs per 1 million acf, such as about 1 to 4 lbs per 1 million acf. In a specific embodiment involving removal of mercury from coal-fired flue gas, the effective amount of the metal sorbent composition is added to the flue gas as a dry powder, or in some cases as a slurry, or in other cases and a combination thereof.

While necessarily dependent on the particular application in which the subject composition is being employed, the subject composition is, in many embodiments, locally delivered to a particular region, site or location of the fluid or fluid stream, where the site or location may, of course, vary. Depending on the particular application, the composition may be delivered to the site of interest manually or with a delivery device, e.g., the delivery device employed to deliver the composition in industrial process streams, described in greater detail below.

The subject compositions and methods are particularly useful in the treatment of coal-fired flue gas to remove the mercury there formed by selective adsorption using the subject compositions. In this embodiment, the metal sorbent composition is added to the flue gas in an "adsorption zone" and separated in the electrostatic precipitator or a wet scrubbing unit or by other means prior to venting the reduced mercury flue gas to the stack. The captured fly ash containing the metal sorbent adduct can then be safely removed and recycled for multiple secondary uses, including use in the preparation of compositions such as cement, plastics and the like. Metal sorbent compositions of the invention that comprise a non-carbon based adsorbent substrate not only captures contaminating metals, but also generates fly ash of exceptional quality with low carbon content. As such, this aspect of the invention overcomes many problems of prior approaches and provides for high mercury removal efficiency from coal-fired, power plant, flue gas using treated natural minerals or zeolite substrates and the like which eliminates disadvantages of using carbon substrates.

Thus in one embodiment, a process is provided for treating a fluid comprising at least one ionic or metallic contaminant, the process involving (a) providing a metal sorbent composition of the invention, and (b) contacting the fluid with the composition under conditions to remove at least part or most of the contaminant from the fluid. Of interest is where the ionic or metallic contaminant consists of at least one or more of the following, including antimony, arsenic, bismuth, cadmium, cobalt, copper, chromium, gold, indium, iron, lead, manganese, molybdenum, mercury, nickel, platinum, silver, tin, tungsten, titanium, vanadium, zinc, zirconium and mixtures thereof. Also of interest is where the fluid consists essentially of a hydrocarbon or a mixture of hydrocarbons. In some embodiments, the fluid consists of a gas stream.

In a specific embodiment, a process is provided for the substantial removal of mercury from a mercury-containing fluid. This method comprises (a) exposing the mercury-containing fluid in an adsorption zone comprising a metal sorbent composition of the invention, where the exposing is under conditions that facilitates capture of a substantial proportion of the mercury by the metal sorbent composition, and (b) separating the metal sorbent composition containing captured mercury from the fluid. In one embodiment, the mercury-containing fluid consists of a gas or vaporized stream. In one embodiment, the mercury-containing fluid consists of a flue gas generated in a combustion system. In one embodiment, the mercury-containing fluid consists of a flue gas generated with a coal-fired combustion system. In a specific embodiment, the mercury-containing fluid consists of a flue gas generated in a coal-fired combustion system for electric generating utility boiler system.

The subject metal sorbent compositions therefore find use in a variety of different applications. Representative applications of the subject metal sorbent compositions include those described in U.S. Pat. Nos. U.S. Pat. Nos. 3,194,629; 4,101,631; 4,338,288; 4,474,896; 4,708,853; 4,814,152; 4,985,389; 5,085,844; 5,352,647; 6,136,749; 6,258,334; 6,524,371; 6,533,842; 6,582,497; 6,589,318; 6,638,347; and 7,288,499; as well as U.S. Application No. 2007/0140940A1; the disclosures of which are herein incorporated by reference.

Kits and Systems

Also provided are kits and systems for use in practicing the subject methods.

The systems may include storage, mixing, delivery, treatment, and/or removal elements for employing a metal sorbent composition to remove a metal contaminated fluid, such as silos, hoppers, auger devices, injection ports, mixing chambers, absorption zones, capture chambers, traps, precipitators, filters, retrieval ports, etc.

The kits find use in practicing the subject methods, where certain kits typically include a distinct aqueous composition of elemental sulfur particles and adsorbent substrate composition components of a metal sorbent composition, as described above. The microfine elemental sulfur and adsorbent substrate compositions may be present in separate containers in the kit, for example, where the microfine elemental sulfur is present in a first container and the adsorbent substrate is present in a second container, where the containers may or may not be present in a combined configuration. The subject kits may further include a metal capture enhancing agent, such as a halogen source and/or oxidizing agent, as described above, which may be present in one or both of the above compositions, or in one or more additional separate containers.

Further kits for use in practicing the subject methods are provided, where the kits typically include a distinct first composition of elemental sulfur particles supported on first adsorbent substrate, and a distinct second composition of a metal capture enhancing agent, such as a halogen source and/or oxidizing agent supported on a second adsorbent substrate, which when combined form a metal sorbent composition of the invention, as described above. These first and second compositions may be present in separate containers in the kit, for example, where the first composition with the elemental sulfur particles is present in a first container, and the second composition with the metal capture enhancing agent is present in a second container, where the containers may or may not be present in a combined configuration. Here again the subject kits may further include one or more additional metal capture enhancing agents that may be present in one or both of the above compositions, or in one or more additional separate containers.

A featured aspect includes kits having a pre-determined (i.e., pre-measured or pre-weighted) amount of the components in each container. In this embodiment, for example, the content of each container in the kit (or measured fractions thereof) can be combined to form a metal sorbent composition with the desired properties. The subject kits may also include an aliquoting and/or mixing device, such as for mixing the contents of the first and second containers, or one or more additional containers if the elemental sulfur and a metal enhancing agent are prepared and stored on separate supports, together to produce the metal sorbent composition. The kits may also include a delivery device (which may or may not include a mixing element) as described above. Additional components may also be present, such as one or more system components described above.

As such, in certain embodiments, a metal sorbent kit is provided for removing a metal contaminant from a fluid, where the kit comprising as components: (a) a first container containing a first composition, the first composition comprising an aqueous suspension or solution of highly dispersed microfine elemental sulfur particles; and (b) a second container containing a second composition, the second composition comprising adsorbent substrate particles, where the first and second compositions are each individually provided in pre-measured amounts for forming a metal sorbent composition upon applying and drying the aqueous dispersion of microfine elemental sulfur particles onto the adsorbent substrate.

In other embodiments, a metal sorbent kit for removing a metal contaminant from a fluid is provided, where the kit comprising as components: (a) a first container containing a first composition, the first composition comprising elemental sulfur particles supported on a first adsorbent substrate particle: and (b) a second container containing a second composition, the second composition comprising a metal enhancing agent supported on a second adsorbent substrate particle, where admixing of the first and second compositions forms a metal sorbent composition, and where the first and second compositions are provided in at least a weight ratio sufficient to have a metal capture enhancing effect on the metal sorbent composition upon admixing.

The kits may further include other components, for example, dispersing agents and systems, mixing devices, application devices, etc., which may find use in practicing the subject methods.

In addition to above-mentioned components, the subject kits typically further include instructions for using the components of the kit to practice the subject methods. The instructions generally specify a method for combining the kit components in an appropriate weight ratio to form a metal sorbent composition, and more generally specify a weight ratio that provides a metal capture enhancing effect on the resultant metal sorbent composition, etc., which may find use in practicing the subject methods.

The instructions for practicing the subject methods are generally recorded on a suitable recording medium. For example, the instructions may be printed on a substrate, such as paper or plastic, a container itself, etc. As such, the instructions may be present in the kits as a package insert, in the labeling of the container of the kit or components thereof (i.e., associated with the packaging or subpackaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

The following examples are provided by way of illustration and not by way of limitation.

EXPERIMENTAL

Example 1

Metal Sorbent Preparation

Various metal sorbent compositions were prepared in which an aqueous suspension or solution of microfine elemental sulfur particles were included. Specifically, samples of different support material were sprayed with an aqueous suspension or solution of active components and dried. Illustrative metal sorbent compositions were prepared as shown in Table 1. The Chabazite support had a particle size distribution of −100 mesh and 4-325 mesh (MV=100 μm, D50=58 μm). A second Chabazite support has a particle size distribution of −325 mesh (MV=9 μm, 050=6.5 μm). The Diatomaceous Earth (DE) support had a particle size distribution of 325 mesh (MV=16 μm, and D50=10.6 μm). Mean diameter in microns of the "volume distribution" represents the center of gravity of the distribution.

All samples were prepared by adding 1 kilogram (Kg) of support material to a 5 gallon drum mounted on a cement mixer drive. The drum was equipped with lifters to ensure good product uniformity. The drum was rotated and the solution sprayed on support material. The drum walls were scraped to ensure uniform product. After spraying, the mix was tumbled for 10 minutes to complete mixing. All treated material was then dried at 95° C. for approximately 12 hrs.

TABLE 1

Metal Sorbent Preparation

| Sample Designation | Support Material | Support Particle Size | | Additive Concentration |
|---|---|---|---|---|
| | | MV (microns) | D 50 (microns) | |
| EX1 | Bowie Chabazite (−100 mesh) | 100 | 58 | 3 Wt-% $S_8$ |
| | EX1 Preparation: Add 30 grams sulfur (46.1 grams of a 65% aqueous suspension of elemental sulfur). Spray on 1 Kg of support material. | | | |
| EX2 | Bowie Chabazite (−100 mesh) | 100 | 58 | 3 Wt-% $FeCl_3$ |
| | EX2 Preparation: Add 30 grams ferric chloride (74 milliliters (ml) of a 40% solution) to 200 ml of water. Spray on 1 Kg of support material. | | | |
| EX3 | White Cliffs DE | 16 | 10.6 | 3 Wt-% $FeCl_3$ |
| | EX3 Preparation: Add 30 grams ferric chloride (74 ml of a 40% solution) to 200 ml of water. Spray on 1 Kg of support material. | | | |
| EX4 | EX4 Preparation: Blend of a 50/50 mix of EX1 and EX3. | | | |

Example 2

Metal Sorbent Evaluation

Evaluation of metal sorbent compositions was conducted using a lab-scale multiphase flowreactor, 5 ft length×6 inch width column with real flue gas on-line at the Electric Energy Inc. 1,086 MWh utility in Joppa, Ill., U.S.A (Joppa Power Plant). The sorbent addition rate was scaled to equal 4 lbs of sorbent for 1 million actual cubic feet of flue gas, 4 lbs/1 million acf. The equipment and testing process were according to standard methods (Wu et al., *Chemical Engineering Science* (2008) 63:782-790). The Joppa Power Plant described above burns Powder River Basin (PRB) coal from Wyoming, which is one of the most difficult coals for removal of mercury. This specific flue gas composition was in the range of 1) Hg~11,000 ng/m3=8 ppb, Hg(0)/Hg(VT)=80%, 2) $SO_2$=350 ppm, 3) NOx=75 ppm, 4) HCl=5-10, ppm, 5) $O_2$=8% and 6) $CO_2$=11%.

Example 3

Metal Capture Performance

Figure 2:
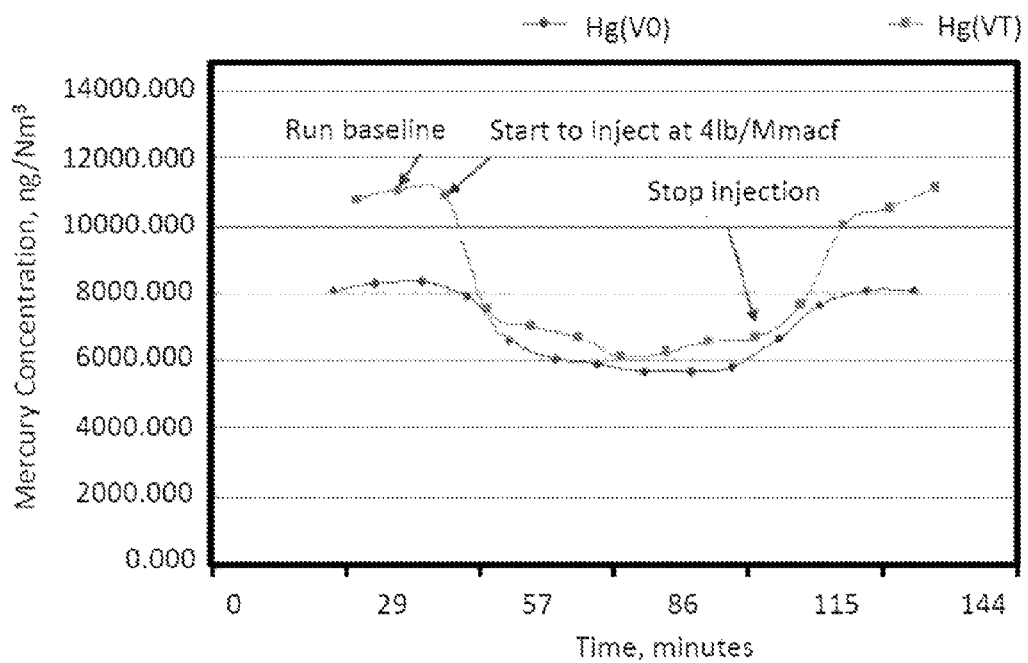
FIG. 2 illustrates multiphase flowreactor test results for sorbent with 3 $S_8$ on Chabazite substrate.

The mercury content of the flue gas was determined before, during and after addition of the metal sorbent composition using an on-line Hg analyzer, semi-continuous emission monitor (Hg-SCEM) (Kellie et al. "Mercury emissions from a 100-MW wall-fired boiler as measured by semi-continuous mercury monitor and Ontario hydro method," *Fuel Progressing Technology* (2004) 85:487-499). The efficiency for mercury adsorption was calculated from the Multiphase Flowreactor experiments and was normalized based on the results of a carbon base product of DARCO® Hg-LH, a lignite powdered activated carbon from Norit Americas Inc. (Marshall, Tex., USA). The change of the mercury concentration with metal sorbent injection was monitored for each test. See FIG. 2, for data associated with EX1 (Lab-scale Multiphase Flow-reactor Test results for metal sorbent composition with 3 Wt-% $S_8$ on Chabazite).

For these tests the flow tube reactor was heated to 150° C. and the metal sorbent composition added at the top of the tube with an exposure to the flue gas from the drop time of only 1 second—thus a one second reaction time. Even with these short contact times, ample reactivity was realized. From these data, it is expected that larger scale applications with substantially longer exposure time will result in further improved performance.

Comparative control samples (Blank/Fly Ash, and Chabazite support only), see Table 2, show that the blank and the untreated support—the zeolite known as Chabazite offer a comparable modest effect with only about 30 to 45 mercury removal compared to DARCO® Hg-LH carbon standard.

Metal sorbent composition EX1 clearly shows the advantage of the reactive sulfur with an average particle size of less than 10 microns and with approximately 10 vol-% of the sulfur in the submicron particle size range. This experimental sample with only 3 wt-% sulfur provided a 73% removal compared to DARCO® Hg-LH carbon standard. In contrast, a metal sorbent composition prepared with a lab sublimed powder sulfur of average particle size of 40 microns was found to be less effective in removing mercury as compared to EX1.

Metal sorbent composition EX4 shows the surprising advantage of combining the metal sorbent composition of microfine elemental sulfur particles with a halide source. In addition, the performance observed by combining the two separate particle compositions as a blend was unexpected. Here 85% recovery efficiency was observed versus a linear average of the two components of 76% for the individual components at twice the loading. It is believed that this performance is exceptional for a non-carbon adsorbent tested in a similar fashion, which includes more than 400 candidate systems. Furthermore, a metal sorbent composition with a bromide source ($CaB_2$) was found to exhibit very high mercury capture performance (data not shown), supporting the use of a halide source in general. These data indicate that inclusion of a halide source with the above metal sorbent compositions impart an unexpected metal capture enhancing effect on the composition. Specifically, these data shows the unique metal recovery effect of sorbent compositions produced by combining microfine elemental sulfur particles with a halogen source, such as a chlorine, bromine, or iodine source according to representative embodiments of the subject invention,

TABLE 2

Mercury Capture Performance

| Composition | Hg(T) Capture Efficiency vs. Darco (%) |
| --- | --- |
| Blank, Fly Ash | 30 |
| Chabazite | 45 |
| 3 Wt-% $S_8$ on Chabazite (Lab Sublimed Sulfur dV50 = 40 microns) | 63 |
| 3 Wt-% $S_8$ on Chabazite (Aqueous Suspension Sulfur dV50 = 7 microns) | 73 |
| 3 Wt-% $FeCl_3$ on Chabazite | 60 |
| 3 Wt-% $FeCl_3$ on DE | 79 |
| 1.5 Wt-% $S_8$ on Chabazite + 1.5 Wt-% $FeCl_3$ on DE | 85 |

Example 4

Leachate Evaluation

The standard U.S. Environmental Protection Agency's (EPA) approved test protocol for assessing leaching is the Toxicity Characteristic Leaching Procedure (TCLP). This test is recommended to determine if a waste is legally required to carrying a hazardous waste code. If a "Solid Waste" fails the test, it will be considered to be a characteristic hazardous waste. To pass the TCLP test for mercury, the leachate must contain less than 0.2 parts per million (ppm) Hg.

The TCLP test was conducted to determine the mobility of mercury present in representative metal sorbent compositions: EX1 and EX3. The TCLP test results show that the compositions pass the test with a large margin: showing leaching levels about 1000 times less than required action level. For example, the leachate under the TCLP test for EX1 was determined to be 0.03 parts per billion (ppb), and for EX3 it was determined to be 0.021 ppb.

Example 5

Effect of Drying Temperature on Mercury Capture Performance

The effect of preparing the metal sorbent compositions under different drying temperatures was examined. The results are reported in Table 3.

TABLE 3

Effect of Drying Temperature on Mercury Capture Performance

| Sample Designation | Support Material | Composition | Hg(T) Capture Efficiency vs. Darco (%) |
| --- | --- | --- | --- |
| ZMM Hg 306W B | Chabazite* | Dried at 95° C. for ~12 hrs 3.0 w % $S_8$ O-750 | 73.8% |
| ZMM Hg 306W BHT | Chabazite* | Dried at 135° C. for ~12 hrs 3.0 w % $S_6$ O-750 (melt dry) | 64.3% |

Note:
*Chabazite particle size = –325 mesh

The above results evidence among other aspects a new use for micron and submicron aqueous dispersions of elemental sulfur and the resulting compositions. The subject metal contaminant removal compositions containing submicron and single digit micron elemental sulfur particles provide outstanding performance for mercury removal. Furthermore, the optional halogen source in combination with the active sulfur surprisingly provides synergistic improvements for the removal of the mercury contaminants. Specifically, the results reported herein and shown in FIG. 1, FIG. 2, Table 1, Table 2 and Table 3 demonstrate that when a metal sorbent composition comprising a dispersion of microfine elemental sulfur particles bound to an adsorbent substrate such as a zeolite, the mercury capturing efficiency of the sorbent is improved. In addition, the results demonstrate that the elemental sulfur particles and a metal capture enhancing agent such as a halogen source can be present on the same substrate or on separate substrates in the composition, thereby providing a metal sorbent composition and components with broad flexibility in terms of production, storage, combination and the like. Together, the results demonstrate a significantly improved overall metal sorbent composition, and process for its production and use.

It is evident from the above results and discussion that the present invention provides an important new type of metal sorbent composition and methods of production that can be used in a variety of different applications, where benefits of the subject compositions include, but are not limited to, economical, robust and safe production, efficient metal capture, high quality fly ash generation, and the like. Accordingly, the present invention represents a significant contribution to the art.

Although the foregoing invention has been described in some detail by way of illustration and example for purposes of clarity of understanding, it is readily apparent to those of ordinary skill in the art, in light of the teachings of this invention, that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method of producing a metal sorbent composition, the method comprising:
    (a) applying a metal capturing effective amount of an aqueous suspension of activated microfine elemental sulfur particles onto an absorbent substrate under conditions to form a mixture, the mixture comprising a dispersion of the particles supported on the surface of the substrate; and
    (b) drying the mixture under conditions that avoid melting the activated microfine elemental sulfur particles to produce the metal sorbent composition.

2. The method according to claim 1 which further comprises applying a metal capture enhancing agent to the adsorbent substrate in an amount having a metal capture enhancing effect on the metal sorbent composition.

3. A method of producing a metal sorbent composition, the method comprising:
    admixing a metal capturing effective amount of (a) elemental sulfur particles supported on a first adsorbent substrate particle, and (b) a metal capture enhancing agent supported on a second adsorbent substrate particle, wherein the elemental sulfur particles and the metal capture enhancing agent are supported on separate adsorbent substrate particles and present in a weight ratio having a metal capture enhancing effect on the metal sorbent composition, and wherein the first and second adsorbent substrate particles are comprised of the same or different material.

\* \* \* \* \*